PULSE CODE DETECTING SYSTEMS

Filed Oct. 2, 1961

2 Sheets-Sheet 1

Lloyd R. Brown
INVENTOR.

BY Michael P. Breston

AGENT

Sept. 14, 1965 L. R. BROWN 3,206,681
PULSE CODE DETECTING SYSTEMS
Filed Oct. 2, 1961 2 Sheets-Sheet 2

Lloyd R. Brown
INVENTOR.
BY Michael P. Breston
AGENT

United States Patent Office 3,206,681
Patented Sept. 14, 1965

3,206,681

PULSE CODE DETECTING SYSTEMS

Lloyd R. Brown, Sarasota, Fla., assignor to Electro-Mechanical Research, Inc., Sarasota, Fla., a corporation of Connecticut Filed Oct. 2, 1961, Ser. No. 142,138
2 Claims. (Cl. 325—321)

This invention relates generally to pulse-code detecting systems and more particularly to clock generators and signal conditioners employed in receivers of code-modulated pulses.

In many applications, for example, in telemetry, it is often more convenient to transmit intelligence in digital rather than in analog form. In such applications, pulse-code modulation (PCM) is employed increasingly. Although higher level digital codes are known and may be utilized, in practice, however, the information is generally conveyed in the bi-level or binary code. A typical binary PCM wave may consist of a series of pulses of constant amplitude but of opposite polarity (plus-minus or on-off pulses). Each pulse thus forms a binary digit, or bit. Conventionally, the plus and minus signals are termed respectively the "1" and "0" bits. The relative positions of the "1's" and the "0's" in the coded wave depend upon the corresponding values of the encoded information. In sum, a binary PCM wave includes a series of pulses, the sequence of which determines the transmitted encoded intelligence.

Because of low-power transmission, ever increasing transmission distances, severe environmental conditions, etc., the transmitted PCM wave becomes greatly distorted. The distortion, or noise, gives rise to an appreciable noise-to-signal ratio and, consequently, to the need for a dependable and accurate clock generator and signal conditioner (PCM receiver). Although several known types of PCM waves are known in the art such as, for example, RZ (return-to-zero), NRZI (non-return-to-zero-inverted) NRZ (non-return-to-zero), "Di-Phase," etc., the most widely used mode is the NRZ because it allows the attainment of optimum bit rates and occupies a minimum of the transmission's bandwidth.

To reconstruct, at the receiving end, from a distorted binary PCM wave a substantial replica of the originally transmitted PCM wave consisting of "clean" bit transitions (or bit decisions) required, in past efforts, costly complex networks which tended to reduce the over-all reliability of the PCM receiver. The reconstruction of a clean PCM wave is rendered even more difficult by the employment of the NRZ mode wherein long strings of "1's" and "0's" are often likely to occur thereby making it hard to determine the bit's transitions. To establish where one bit ends and the other begins, a time scale, formed by reference or clock signals, is supplied to time the incoming PCM wave. Conveniently, such a time scale may be established by the leading and/or lagging edges of clock pulses derived from a clock generator.

To provide an accurate clock generator for scaling purposes and to condition optimally the received distorted PCM wave, especially arranged phase-locked loops can be employed advantageously because of their ability when properly utilized to enhance greatly the receiver's signal-to-noise performance and to synchronize (lock) the output wave of a local signal generator (clock) with the received PCM wave.

Accordingly, it is a general object of this invention to provide new and improved clock generators and signal conditioners of the foregoing type which employ especially arranged phase-locked loops.

It is another object of this invention to provide new and improved clock generators and signal conditoners in which the quantity of intelligence carried by each bit is integrated, and the result of the integration is used to establish whether the bit is a binary "1" or a binary "0."

It is a further object of this invention to provide new and improved clock generators and signal conditioners which require a minimum of networks thereby affording great economy of operation.

These and other apparent objects are attained in accordance with this invention by providing a signal-conditioning network for obtaining a clean replica of the received PCM wave and by employing a phase-locked loop to synchronize a reference wave produced by a local signal generator with the received wave; the clean replica is then coupled to especially provided phase-comparing means within the phase-locked loop to assure proper loop performance.

The foregoing and other objects and advantages of the invention will appear more fully hereinafter from a consideration of the detailed description which follows, taken in conjunction with the accompanying drawing wherein one embodiment of the invention is illustrated. It is to be expressly understood, however, that the drawing is for the purpose of illustration and description only and is not to be construed as defining the limits of the invention.

Figure 1:
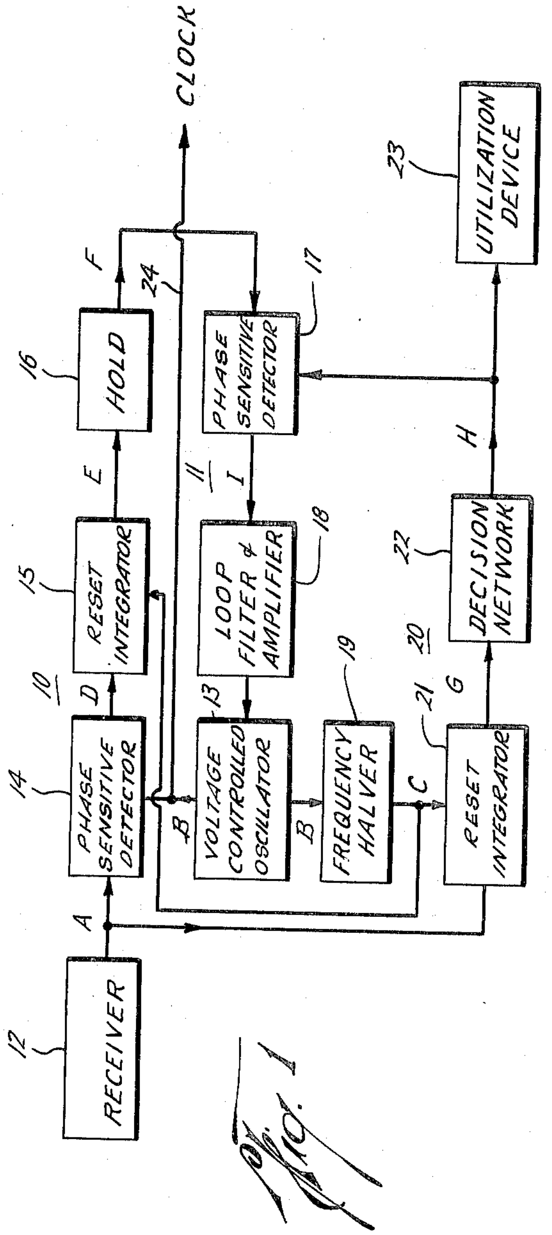
FIG. 1 is a block diagram of a clock generator and signal conditioner in accordance with a preferred embodiment of the invention.
Figure 2:
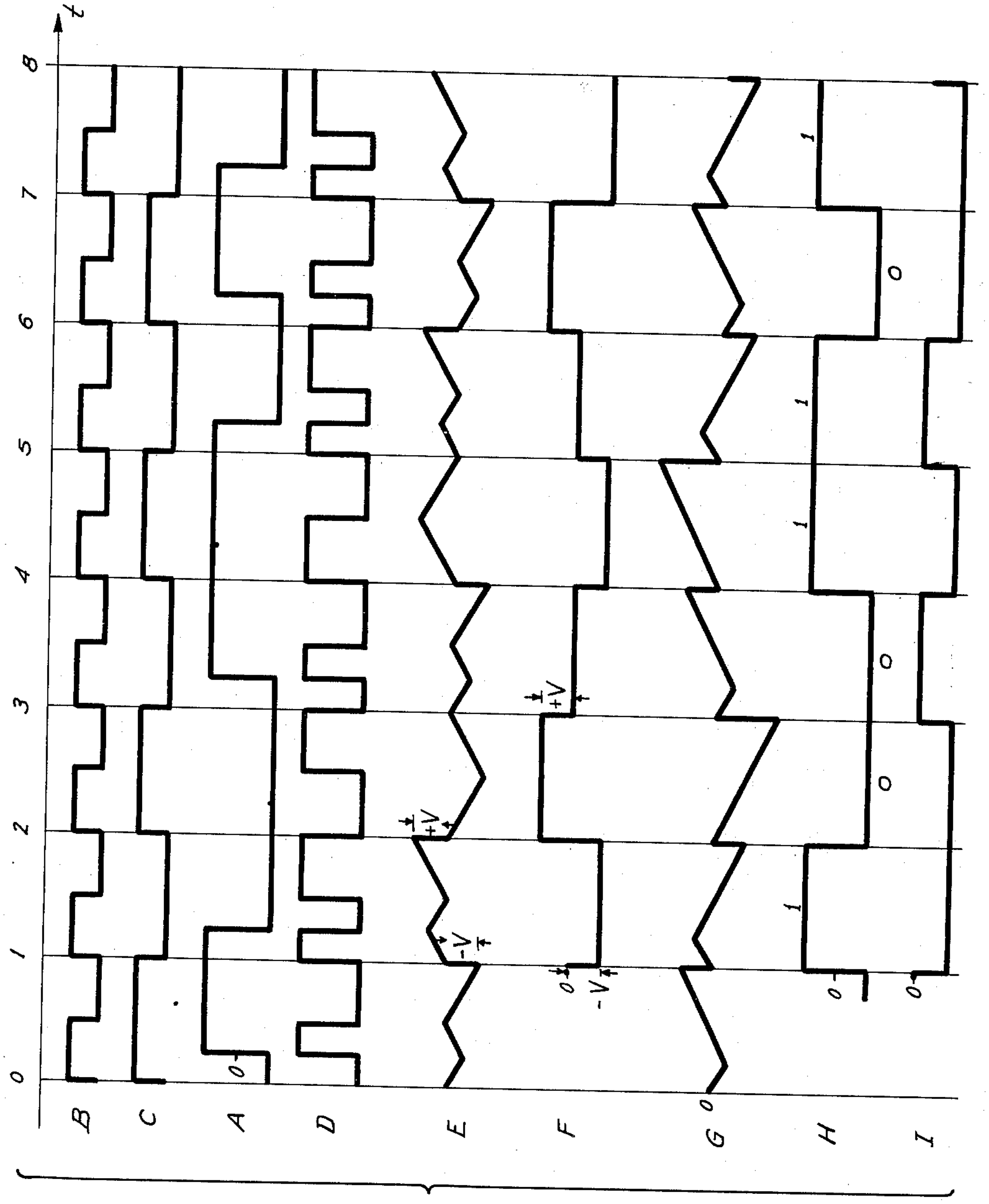
FIG. 2 shows exemplary wave forms in the clock generator and signal conditioner of FIG. 1.

Referring now to FIGS. 1 and 2 there is shown a clock generator and signal conditioner, generally referenced with the numeral 10, arranged and constructed in accordance with a preferred embodiment of the invention. It includes a phase-locked loop 11 for synchronizing the clock's pulses B with the bits contained in the received PCM wave A derived, for example, from a telemetry receiver 12, a subcarrier discriminator, or, more often, from a playback unit of a magnetic recorder (not shown).

The phase-locked loop 11 includes a voltage-controlled oscillator (VCO) 13, a phase-sensitive detector (PSD) 14, a reset integrator 15, a hold circuit 16, another phase-sensitive detector 17, and a loop filter and amplifier (stabilization) network 18, all cascaded around the closed loop as shown.

To provide more divisions on the clock's time scale, the VCO 13, typically a free-running multivibrator, generates a rectangular wave B whose pit period is equal to one-half of the bit period of the incoming signal A. In other words, the time interval between two consecutive leading edges in signal B is equal to a bit period in signal A. Hereinafter the bit period of signal A will be taken as the time unit. To generate for timing purposes clock pulses C which have a time duration equal to a unity bit period, a frequency halver 19 may be coupled to the output of VCO 13. Usually, the nominal rate of the clock pulses C is known to within close tolerances, say ±1% or better. Obviously, the VCO 13 may be constructed in a manner as to provide both signals B and C, if desired.

By acting as a gate or multiplier circuit, the phase-sensitive detector 14 compares, during each bit period, the phase or the time position of the incoming bit's transition (if any) in signal A (a positive bit transition will be arbitrarily defined as the edge separating a "0" from a "1" and, inversely, a negative transition as the edge separating a "1" from a "0") with the time position of the corresponding edge in the reference signal B and provides a ripple A.C. signal D affording an average or D.C. component (known as the loop's "error" signal) which is indicative of their relative time positions; i.e., the amount (measured in bit periods) by which the sensed transition in signal A is shifted in time with respect to its corresponding transition in the reference signal B.

Figure 3:
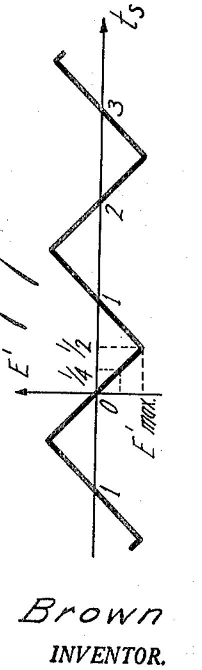
FIGS. 3 and 4 are curves helpful in explaining the operation of the clock generator of FIG. 1.

In FIG. 3 is shown a typical voltage-versus-time-shift characteristic curve of a phase-sensitive detector or multiplier 14 when operating on rectangular waves which are hereinafter called A′ and B′ to indicate their similarity with waves A and B above described. The PSD multiplies waves A′ and B′ and provides their product wave D′. The average voltage value E′, in volts, of signal D′ is plotted on the vertical axis and the time shift, in bit periods, between signals A′ and B′ on the horizontal axis. It can be readily seen that when the time shift $t_s$ between signals A′ and B′ is ¼ bit period, $E'=\frac{1}{2}E'_{max}$: where $E'_{max}$ is the maximum value of E′, attained when the time shift $t_s=\frac{1}{2}$ bit period. When $t_s$ increases by even multiples of a bit period, the polarity and the magnitude of E′ remain the same. However, when $t_s$ increases by odd multiples of a bit period, the magnitude of E′ remains the same but its polarity changes signs. In other words, when a positive transition in signal A′ is compared with a positive transition in signal B′, then the polarity of the D.C. component E′ in signal D′ is negative and, inversely, when a negative transition in signal A′ is compared with a positive transition in signal B′, then the polarity of E′ is positive (or vice versa).

By analogy to the foregoing, if in FIG. 1 the bit's transition in signal A changes from a "1" to a "0," then the average value of signal D will have one polarity and, inversely, if it changes from a "0" to a "1" this average value will have an opposite polarity. It will be appreciated that the dependence of the average value of signal D upon the polarity of the bits' transitions in signal A is highly undesirable since this average value, when reaching the output of the loop filter 18, determines the amount and direction by which VCO 13 will shift signal B. It is desired, therefore, that this average value per bit period have, for a given time shift between signals A and B, the same polarity regardless of the direction of the particular bit's transition being compared by the PSD 14.

To compensate for the dependence of the phase-sensitive detector's output upon the bit transition's polarity, the ripple signal D will be transformed into plus-minus pulses F, each having a unity bit period. Consequently, the magnitude of the F pulses will represent the absolute value of the time displacement between signals A and B, and the pulses' polarity will indicate the polarity of the transitions in signal A. Signal F will then be multiplied by an inphase reconstructed PCM signal H to yield a "corrected" loop-error signal I (instead of the "raw" loop-error signal D) whose polarity will depend only upon the polarity of the time shift between signals A and B, i.e., whether signal A is leading or lagging signal B.

To that end, reset integrator 15, triggered by a clock pulse C, starts integrating the ripple signal D for a time interval equal to a bit period. In response to the next clock pulse C, integrator 15 resets to zero and immediately recommences its integration cycle, and so on. The hold circuit 16 holds, during a time interval equal to a bit period, the integrator's output reached just prior to resetting to zero. In sum, the ripple signal D now has been transformed by integrator 15 and holds circuit 16 into a signal F consisting of a series of plus and minus pulses having a magnitude which depends upon the absolute value of the time shift between signals A and B and a polarity which depends upon the polarity of the incoming intelligence bits.

To obtain the reconstructed or conditioned PCM wave H for use as a gating signal for signal F, the distorted PCM wave A is processed through a signal-conditioning branch 20 including a reset integrator 21 followed by a decision network 22. Reset integrator 21 functions in the same manner as the previously described reset integrator 15: a clock pulse C initiates the integration cycle during which signal A is integrated and the next clock pulse C resets integrator 21 to zero. The decision circuit 22 decides, at the completion of each integration cycle, whether the integrator's output is plus or minus, that is, a binary "1" or a binary "0." Consequently, the output signal H from the decision network 22 is the desired reconstructed PCM signal having "clean" bit transitions. Signal H may then be applied to a utilization device 23, such as a digital computer.

Signal H is multiplied by signal F in the phase-sensitive detector 17 thereby producing the corrected loop error signal I whose magnitude and polarity now are dependent only upon the absolute value of the time shift $t_s$ between signals A and B.

After passing through the loop filter network 18, error signal I operates on VCO 13 to shift signal B in a direction tending to cancel the time shift $t_s$ between signals A and B originally responsible for the production of the D.C. component E in signal D. When signals A and B become synchronized, the D.C. component in signal D vanishes and, consequently, signal I becomes substantially zero.

A typical operation of the clock generator and signal conditioner 10 will be more fully understood by reference to the exemplary wave forms shown in FIG. 2. Inasmuch as the nominal bit rate in the incoming PCM wave A (for example in the NRZ mode) is known, the VCO 13 can be set to generate a rectangular wave B having a double bit rate. The shape of wave A is chosen purposely to show that one or more binary "0's" or binary "1's" can follow in succession. It will be noted that signals A and B are shifted by a time shift $t_s$ corresponding to one quarter of a bit period.

The phase-sensitive detector 14 multiplies signals A and B and provides their product D. To obtain clock pulses C, in synchronism with signal B, for timing the operation of reset integrators 15 and 21, signal B is applied to the frequency halver 19. In response to the first leading edge of signal C at $t=0$, integrator 15 begins integrating signal D to produce wave form E. At $t=1$ integrator 15 attains a value −V, then resets to zero and recommences its integrating cycle. At $t=2$ it reaches a value +V, resets again to zero and starts integrating anew. At $t=3$ the value reached is zero; at $t=4$ it is −V; at $t=5$ it is zero; at $t=6$ it is +V; and at $t=7$ it is −V.

At $t=0$ the holding circuit 16 has no information on the average value of signal D prior to $t=0$. Hence during the first bit period, i.e., prior to $t=1$, hold circuit 16 has no output. At t=1 it receives the −V value from integrator 15 and holds it until $t=2$. At $t=2$ it receives the +V value from integrator 15 and holds it until $t=3$. At $t=3$ it receives no output from integrator 15 and, consequently, its output is zero until $t=4$, and so on.

In the meantime, at $t=0$ integrator 21, triggered by pulse C, starts integrating signal A to produce signal G. At $t=1$ it resets to zero and starts its integration cycle anew. At $t=2$ it will again reset to zero, etc. At $t=1$ the decision network 22 receives the output of integrator 21 and decides whether it is positive or negative. The polarity of the integrator's output is indicative of the polarity of the area under curve A being integrated. Since for the time interval between $t=0$ and $t=1$ the average area under curve A is positive, as shown, the decision network will hold a binary "1" during the second bit period. At $t=2$ the decision network decides from the output of integrator 21 that the average area under curve A during the second bit period was negative and, consequently, it will hold a binary "0" during the third bit period. By analogy, it will decide to hold a binary "0" during the fourth and seventh bit periods and a binary "1" during the fifth, sixth, and eighth bit periods. A comparison between signals A and H will reveal that signal H is a substantial replica of signal A but lags signal A by ¾ of a bit period. The lag will be one bit period when, due to the action of loop 11, signals A and B become synchronized. Signal H is therefore the desired conditioned PCM wave consisting of "clean decisions" for each bit regardless of the distorted nature of the incoming bits A.

It should be noted that even though some decisions might be wrong yet the operation of the clock generator and signal conditioner will not be noticeably affected thereby. Inasmuch as the two reset integrators 15 and 21 are gated by the same clock pulses C, signals F and H are synchronized and their product I, when it exists, produced by the phase-sensitive detector 17 is the desired corrected loop error signal previously described.

Figure 4:
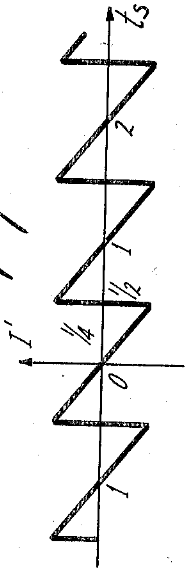

To show the effect of multiplying signal F by signal H, FIG. 4 is drawn in a manner similar to FIG. 3. FIG. 4 is the characteristic curve of PSD 17. The average value I', in volts, of signal I is plotted on the vertical axis and the time shift $t_s$, in bit periods, on the horizontal axis. It will be appreciated that now the polarity of I' remains the same whether $t_s$ is shifted by even or by odd bit periods. Consequently, the polarity of signal I no longer depends (as did signal F) upon the polarity of the transition in signal A being sensed by the PSD 14.

The loop filter network and amplifier 18 will suitably condition the corrected error signal I and apply it to the input terminal of the voltage-controlled oscillator 13 which will cause signal B to shift so as to eliminate the time shift between signals A and B. The clock pulses may be conveniently derived from line 24.

It will be appreciated that signal H is required in the obtention of the clock pulses and consequently the embodiment of FIG. 1, while employing only those networks which are required by the clock generator, automatically also yields a reconditioned PCM wave without necessitating any additional networks.

Obviously, the preferred embodiment of this invention is subject to many modifications as will be readily apparent to a man skilled in the art. For example, phase-locked loop 11 may take on a variety of forms depending upon the incoming signal-to-noise ratio, the desired loop stability, operating frequency, response time, etc. The phase-sensitive detector 17 may be variously located within the system and need not be between hold circuit 16 and loop filter 18. More than two phase-sensitive detectors may be employed, if desired, as long as the loop error signal is properly conditioned for synchronizing the clock signal with the incoming signal A. It will also be understood that the clock generator and signal conditioner in accordance with this invention is not limited to any particular type code.

Therefore it will be evident that the described embodiment is susceptible to various modifications in form and design within the scope of the invention as defined in the appended claims.

What is claimed is:

1. In a system for processing an incoming coded electric signal whose amplitude selectively assumes one of two prescribed amplitude levels in accordance with the encoded intelligence, the combination comprising:

a phase-locked loop including: first and second phase-comparing means operatively connected to receive said incoming signal and to provide a clock signal, a reset integrator coupled to the output of said first comparing means, a hold circuit coupled between said reset integrator and said second phase-comparing means, and signal generating means coupled between said first and second phase-comparing means;

signal-conditioning means including averaging means operatively connected to receive said incoming signal and to provide a conditioned signal which is a clean replica of said incoming signal;

means applying said conditioned signal to said second phase-comparing means; and means applying said clock signal to said signal-conditioning means to time the operation thereof.

2. The system of claim 1 wherein said signal-conditioning means includes a decision network coupled to said averaging means.

References Cited by the Examiner

UNITED STATES PATENTS

| | | | |
|---|---|---|---|
| 2,949,503 | 8/60 | Andrews et al. | 179—15 |
| 3,101,448 | 8/63 | Costas | 329—50 |
| 3,109,143 | 10/63 | Gluth | 325—320 |

ROBERT H. ROSE, *Primary Examiner.*